Nov. 29, 1966  J. H. PATON ETAL  3,288,299
OIL FILTER CARTRIDGE
Filed July 5, 1963
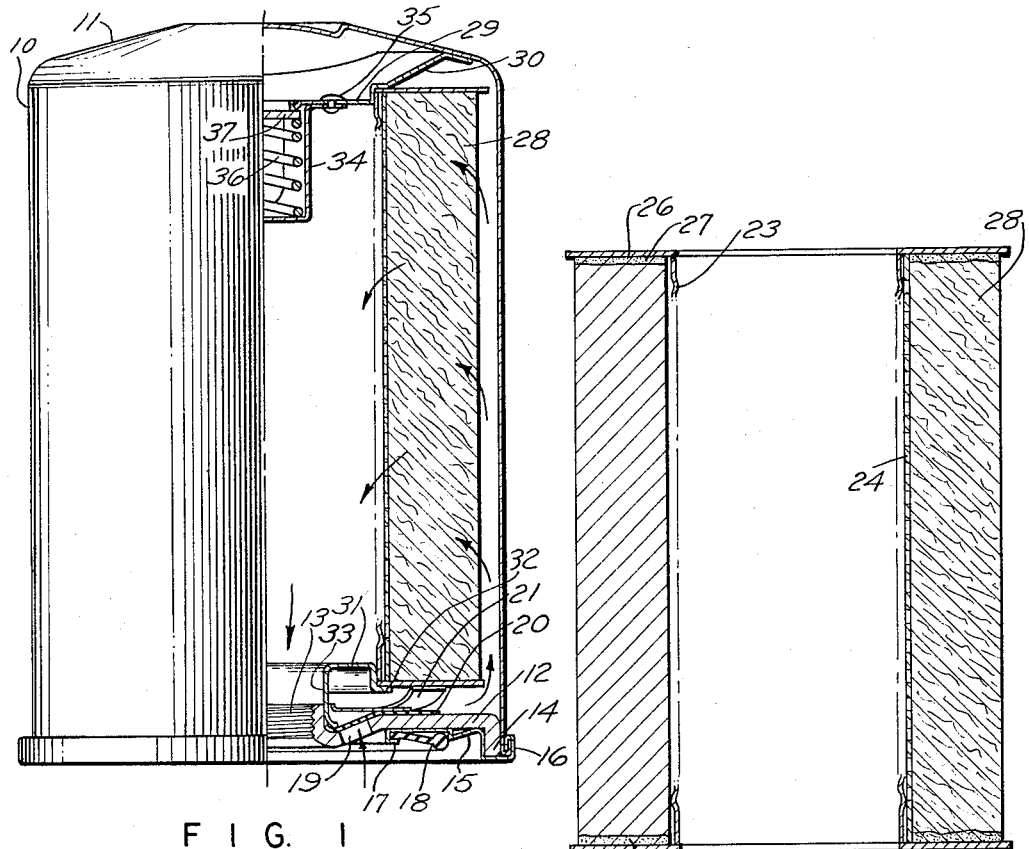
FIG. 1
FIG. 2
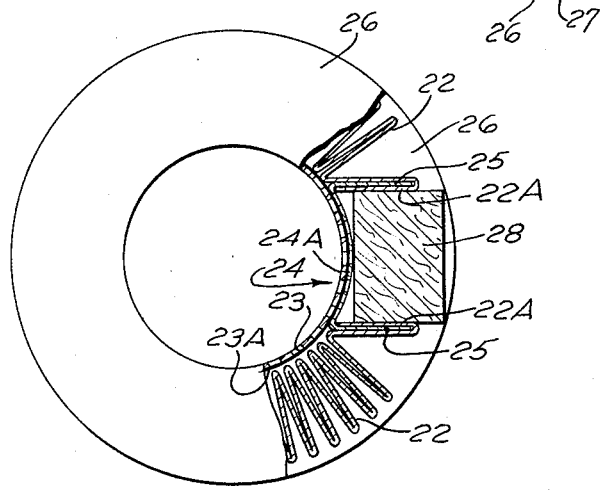
FIG. 3
INVENTORS
JOSEPH H. PATON
ARTHUR F. PETTET
BY Charles G. Willson
ATTORNEY 3,288,299
OIL FILTER CARTRIDGE
Joseph H. Paton, North Attleboro, Mass., and Arthur F. Pettet, Barrington, R.I., assignors to Fram Corporation, Providence, R.I., a corporation of Rhode Island
Filed July 5, 1963, Ser. No. 293,049
1 Claim. (Cl. 210—487)

This invention relates to a dual type of oil filter cartridge wherein part of the flow is through a surface type of filter element such as pleated paper, and the rest of the flow is through a depth type of filter element such as a thick fibrous mass.

More particularly the invention resides in an annular full-flow oil filter cartridge in which a portion of the annular filter media is formed of pleated paper with the pleats extending parallel to the axis of the cartridge for fine filtering action. The remaining segment of the annular filter media is formed of a thick fibrous mass also extending parallel to the axis of the cartridge for coarser filtering action. This arrangement provides important advantages as will be more fully pointed out hereinbelow.

Further important advantages of the present invention result from the provision of a filter media assembly which not only ensures improved filtration and a longer useful life for the cartridge but which also makes possible the production thereof at relatively low cost. This may be better appreciated when it is understood that full-flow oil filters of the type with which the present invention is primarily concerned are produced by high speed mass production techniques to meet exacting performance requirements and should be sufficiently low in cost to permit the filter cartridge to be discarded at regular intervals determined by the life expectancy of the filter media.

In a preferred embodiment, the pleated paper and the fibrous mass are fastened together by an axially extending clip member of trough shape to form a unitary annular filter media subassembly which facilitates high speed assembly of the filter cartridge. While the pleated paper and fibrous mass are of substantially equal axial extent, the relative circumferential extent thereof may be varied to meet the specific filtering requirements where the unit is to be used. Usually the pleated paper extends about the major portion of the circumference of the unit and for best results the relative porosity and area of the pleated paper media and the porosity and size of the thick fibrous mass are such that when the filter body is clean the major portion of the oil flow will be through the paper.

The above and other features of the present invention will be further understood from the following description when read in connection with the accompanying drawing, wherein:

FIG. 1 is a side elevation with parts in section of a screw-on throw-away type of housing provided with the dual filter cartridge of the present invention.

FIG. 2 is a vertical sectional view through the filter cartridge shown in FIG. 1; and FIG. 3 is a top end view with parts broken away of the filter cartridge shown in FIG. 2.

The dual filter cartridge of the present invention may be used as a replaceable cartridge in a permanent filter housing, or it can be used in the throw-away type of filter housing in which the filter cartridge and housing are discarded together when the cartridge needs to be changed. The new cartridge of the present invention is shown in the drawing and will now be described as mounted in the throw-away type of filter housing.

Referring first to FIG. 1 of the drawing, 10 designates a drawn, cup-shaped housing of sheet metal having the closed upper end 11. At the opposite end of this housing is provided the reinforcing plate 12 having a central opening surrounded by the internally threaded neck portion 13. The plate 12 has at its outer periphery an axially extending annular flange 14. To the open end of the housing 10 is secured the end plate 15 having a large central opening and this plate is secured to the housing by the rolled seam 16. End plate 15 is spot welded to the reinforcing plate 12 and such end plate is provided at its inner periphery with the reversely bent rolled seam 17 adapted to retain the ring-sealing gasket 18 in place.

The reinforcing plate 12 has a number of holes 19 formed therethrough about the neck 13 which serve to admit oil into the interior of the filter housing. These holes 19 are preferably covered by the thin flat rubber ring 20 which serves as an antidrain valve; and this antidrain valve is yieldingly held in its closed position by spring means, such as a thin sheet metal ring having cut therefrom the curved spring finger 21 which serve to hold the antidrain member under slight pressure in its closed position. This antidrain valve may not be needed if the oil filter is supported in a downwardly extending position.

The housing features so far described form no essential portion of the present invention and, in fact, are similar to the filter housing disclosed and described in the Coates et al. Patent No. 2,888,141 which is assigned to the assignee of the present invention. The filter housing so far described is constructed to be screwed onto supporting means similar to the adaptor bushing of the Coates et al. patent. Such filter housing and the filter cartridge now to be described are designed to be used as a full-flow type of filter which will filter all of the oil supplied to the engine bearings.

The dual type of oil filter cartridge forming the subject matter of the present invention is shown in all three views of the drawing. The major portion of the filter media of the cartridge is formed of the pleated paper element 22, the pleats of which extend parallel to the axis of the annular filter cartridge and, in the present instance, extend around such axis except for about 30° of the circumference of the filter cartridge, as shown in FIG. 3. The first and last pleats or sectors 22A of the filter element 22 are folded around and tucked into a trough-shaped clip member 24 that extends in the axial direction and has side walls 25 which engage the pleats 22A against the opposite sides of a depth type filter element 28. The clip member 24 has substantially the same length as the pleated paper filter element 22 and with the depth type filter element 28 occupies the remaining about 30° of the circumference of the cartridge.

The clip member 24 is preferably formed from suitable metal such as cold rolled steel having a protective coating of tin, lead or other suitable material. As formed, clip member 24 has an arcuate central web 24A, perforated by a large number of holes, from which the opposite sides 25 extend. The clip member 24 is sufficiently resilient so that with the folded pleats 22A, and the depth type element 28 inserted or wedged therein, the three elements 22, 24 and 28 comprising the two filter elements and the clip member form a self-retaining filter media sub-assembly which markedly facilitates the assembly of the cartridge. At the upper end of the filter cartridge so far described is provided the end closure ring 26 which may be formed of paper or metal, and this ring is bonded to the upper end of the pleats 22 and the upper end of the depth type filter element 28 by a suitable bonding agent 27 such as plastisol. The lower end of the filter body is likewise provided with a sealing ring 26 secured to the pleats 22 and the element 28 by a similar bonding agent 27. To ensure a good seal between the closure rings 26 and the filter media 22 and 28, the clip member 24 is preferably made slightly shorter than the paper element 22 and fibrous mass 28, any resulting space being filled with the bonding agent when the parts are pressed together to complete the seal.

To provide efficient operation as a full-flow cartridge, the porosity and surface area of the paper used to form the pleated filter element 22 relative to the porosity and size of the fibrous mass 28 is selected so that the major portion of the oil supplied to the engine bearings passes through the paper element 22 to the engine bearings so long as this filter element is relatively clean. Such paper may be constructed substantially as the pleated paper used heretofore in full-flow paper cartridges, and the paper is treated to stiffen the same with a bonding agent such, for example, as phenol formaldehyde.

The depth type filter element 28 comprises a relatively long, compact, fibrous mass or wedge, shaped to be embraced by the clip member 24. This thick filter medium 28 may be formed of either natural or synthetic fibers which preferably are bonded one to the other at their crossing points by a bonding agent that does not appreciably interfere with the porosity of this thick fibrous mass. Though the fibrous mass filter elements 28 is a coarser filter than the pleated paper element 22, the latter, because of its relatively large surface area compared to the exposed surface area of the fibrous mass, passes the bulk of the oil until it becomes clogged through use.

Disposed within the central area surrounded by the filter media 22, 28 and the member 24 is a perforated tube 23 against which the inner knuckles of the pleats of the element 22 may rest. Preferably, a porous fabric sleeve 23A is provided around the tube 23 to prevent fibrous particles from being washed through the tube. As shown, sleeve 23A is provided on the upstream side of the tube 23. If it should be desired to have the flow inside-out, then the perforated tube or screen should surround the filter elements 22 and 28 to resist the outward oil pressure.

When desired, means are provided to serve as a bypass valve so that the engine bearings will not be deprived of oil when the filter cartridge becomes plugged with dirt. In the construction shown, a closure plate 29 is provided shaped to fit tightly within the upper end of the center tube 23 of the filter cartridge to close this end. This plate has spring legs 30 (FIG. 1). The ends of these spring legs rest against the inner face of the end wall 11 of the filter housing and serve to exert a yielding downward pressure upon the filter cartridge. At the lower end of the filter cartridge is provided a metal supporting ring 31 having an outwardly extending lip 32 which forms a seat for the lower end of the filter cartridge; and this ring 31 has an annular wall 33, the lower end of which preferably rests upon a portion of the anti-drain ring 20 where such ring lies close to the internally threaded sleeve 13. The arrangement is such that the downward spring pressure exerted by the closure member 29, 30 holds the lower end of the filter cartridge firmly seated on the supporting ring 31.

The closure member 29, 30 supports a bypass valve constructed substantially as shown in the above cited Coates et al. patent. This valve comprises a metal U-shaped support having the side legs 34 each having an outwardly extending foot that is secured by a rivet 35 to the inner face of the plate 29. The legs of this U-shaped support preferably have the shape of an arc in cross section so that they approximately surround a coiled spring 36 confined within this support and which serves to hold a closure disc 37 normally seated in the closed position in which it is shown in the drawing. This bypass relief valve is preferably so constructed that it will open when a differential pressure across the filter cartridge builds up to a predetermined pressure, such as 8 pounds per square inch.

As has been pointed out, the dual flow filter cartridge construction above described and shown in the drawing greatly facilitates mass production of these units at low most. In particular, the clip member 24, in joining the paper element 22 and embracing the depth medium 28, forms a unitary self-sustaining subassembly that makes possible the rapid attachment of the rings 26 in accurately aligned relation to the filter media for sealing the opposite ends thereof.

The filter is mounted by its threaded sleeve 13 in the usual way on the engine with which it is to operate. Being of the outside-in flow type of filter, the direction of flow, as indicated by the arrows in FIG. 1, is upward through the inlet holes 19 and into the housing 10 surrounding the filter cartridge. Then the oil to be filtered passes in parallel through the pleated paper element 22 and the depth type medium 28 into the central space within the tube 23 and out through the outlet within the sleeve 13.

The pleated paper element 22, which forms what is commonly called a surface type of filter medium, due to its many pleats presents a far greater surface area than that of the depth type of filter element indicated by 28. The porosity and area of the pleated element is preferably such that when the filter cartridge is clean, the flow through the pleated paper will exceed the flow through the depth type of filter medium 28. As the present filter remains in service and a contaminant builds up on the paper, the flow through the fibrous mass modifies the oil pressure built up against the paper. This is important because it facilitates the formation of a porous filter cake on the surface of the paper instead of forcing the contaminant into the pores of the paper to plug these pores. Such a filter cake increases the efficiency of the paper to remove very fine dirt particles from the oil passing therethrough.

As the filter cartridge continues in operation, the pleated paper, which does a better filtering job than the fibrous mass, will plug more quickly than the fibrous mass. Therefore, as the contaminant accumulates on the filter paper, the proportion of the total oil flow therethrough will gradually decrease and the proportion of the total oil flow will increase through the fibrous mass 28 as the differential pressure across the cartridge increases. As a result of this construction, the fibrous mass 28, by modifying the pressure build up, acts to delay operation of the bypass valve 37 and the pressure against the paper filter element increases more gradually than would be the case if the entire filter body was formed of pleated paper.

As the percentage of oil flow through the fibrous mass 28 increases, the fibrous mass serves to remove the larger particles from the oil stream that are likely to damage the vital engine parts. The front-to-back thickness and density of the fibrous mass 28 are sufficient to ensure the required filtering action in a single pass of the oil therethrough. The impervious side walls 25 of the clip member 24 and the firm contact of the medium 28 with these walls prevent the oil from bypassing the filter 28 by flowing between this medium and the side walls 25.

Having described our invention, what we claim and desire to protect by Letters Patent is:

A filter cartridge for filtering liquids, comprising an annular filter body formed primarily of a surface type of filter element and to a less extent of a depth type of filter medium each extending the length of the cartridge body, the surface type of filter element being formed of porous pleated paper having axially extending pleats disposed, from a first pleat to a last pleat, in an arc throughout more than three-fourths of the circumference of the cartridge body, an outwardly facing trough-shaped clip disposed within the remaining arc of the circumference of the cartridge body and formed with a perforated bottom and spaced imperforate side walls and having the first pleat of said pleated paper element folded over one side wall of said clip and the last pleat of said pleated paper element folded over the other side wall of said clip, said depth type of filter medium being axially co-extensive with said pleated paper element and formed of a compact thick fibrous mass resiliently confined in said clip between said side walls thereof and holding the first and last pleats of said paper element against said side walls, a pair of annular sealing caps confining each end of the pleated paper element and fibrous filter medium, and a bonding agent securing the ends of said element, said medium and said clip to and between said sealing caps.

References Cited by the Examiner

UNITED STATES PATENTS

| | | |
|---|---|---|
| 2,850,168 | 9/1958 | Nostrand. |
| 2,929,506 | 3/1960 | Belgarde. |
| 3,042,571 | 7/1962 | Jackson _____ 210—493 X |
| 3,127,341 | 3/1964 | Abeles _____ 210—493 |

REUBEN FRIEDMAN, *Primary Examiner.*

D. M. RIESS, *Assistant Examiner.*